United States Patent
Yamamura et al.

(10) Patent No.: US 8,575,254 B2
(45) Date of Patent: Nov. 5, 2013

(54) POLYLACTIC ACID-BASED COMPOSITION AND FILM FORMED THEREOF

(75) Inventors: Gouhei Yamamura, Tokyo (JP); Hiroji Kojima, Tokyo (JP); Masahiro Kimura, Tokyo (JP); Zhengzheng Lai, Jiangsu (CN); Bo Liu, Jiangsu (CN); Ruoyu Qiu, Jiangsu (CN); Tian Xia, Jiangsu (CN); Shunji Kono, Jiangsu (CN)

(73) Assignees: Toray Industries, Inc. (JP); Toray Fibers & Textiles Research Laboratories (China) Co., Ltd. (CN)

( * ) Notice: Subject to any disclaimer, the term of this patent is extended or adjusted under 35 U.S.C. 154(b) by 308 days.

(21) Appl. No.: 12/933,905

(22) PCT Filed: Mar. 13, 2009

(86) PCT No.: PCT/JP2009/054833
§ 371 (c)(1),
(2), (4) Date: Sep. 22, 2010

(87) PCT Pub. No.: WO2009/119336
PCT Pub. Date: Oct. 1, 2009

(65) Prior Publication Data
US 2011/0028629 A1    Feb. 3, 2011

(30) Foreign Application Priority Data

Mar. 25, 2008 (JP) ................. 2008-077706
Sep. 12, 2008 (JP) ................. 2008-234534

(51) Int. Cl.
*C08K 3/32* (2006.01)
(52) U.S. Cl.
USPC ............................ 524/417; 524/394; 524/599

(58) Field of Classification Search
USPC ........................................................ 524/417
See application file for complete search history.

(56) References Cited

U.S. PATENT DOCUMENTS

| | | | |
|---|---|---|---|
| 7,273,902 B2 * | 9/2007 | Takahashi et al. | 524/195 |
| 2004/0157967 A1 * | 8/2004 | Ito | 524/109 |
| 2004/0242803 A1 * | 12/2004 | Ohme et al. | 525/400 |
| 2005/0054755 A1 * | 3/2005 | Takahashi et al. | 524/115 |

FOREIGN PATENT DOCUMENTS

| | | | |
|---|---|---|---|
| JP | 7-316273 | | 12/1995 |
| JP | 2003-113247 | | 4/2003 |
| JP | 2006-328222 | | 4/2003 |
| JP | 2007-138062 | | 6/2007 |
| JP | 2007-211197 | * | 8/2007 |
| JP | 2007-269019 | | 10/2007 |
| JP | 2007-291336 | * | 11/2007 |
| JP | 2008-007750 | * | 1/2008 |
| JP | 2008-7750 | | 1/2008 |
| JP | 2008-156616 | | 7/2008 |
| JP | 2008-296123 | | 12/2008 |
| WO | 2008/102919 | | 8/2008 |

OTHER PUBLICATIONS

Machine translation of JP 2007-291336.*
Machine translation of JP 2007-211197.*
Machine translation of JP 2008-007750.*

* cited by examiner

*Primary Examiner* — Doris Lee
(74) *Attorney, Agent, or Firm* — DLA Piper LLP (US)

(57) ABSTRACT

A polylactic acid-based composition including a polylactic acid-based resin, a buffering agent; and/or a compound derived from the buffering agent.

12 Claims, No Drawings

POLYLACTIC ACID-BASED COMPOSITION AND FILM FORMED THEREOF

RELATED APPLICATIONS

This is a §371 of International Application No. PCT/JP2009/054833, with an international filing date of Mar. 13, 2009, which is based on Japanese Patent Application Nos. 2008-077706, filed Mar. 25, 2008, and 2008-234534, filed Sep. 12, 2008, the subject matter of which is incorporated by reference.

TECHNICAL FIELD

This disclosure relates to a polylactic acid-based composition with good hydrolysis resistance, and a film formed thereof.

BACKGROUND

In recent years, with growing environment awareness, the soil pollution problem caused by the disposal of plastic products and the global warming problem caused by the increase of carbon dioxide generated by incineration attract attention. Energetic R&D activities are underway to develop various biodegradable resins for addressing the former problem, and to develop resins made from plant-derived materials which do not emit a new load of carbon dioxide into the atmosphere even if they are burned, for addressing the latter problem. Also for use as shaped articles for exhibiting and packaging various commodities and as containers such as food trays and drinking cups, various biodegradable resins and resins made from plant-derived materials are being developed. Above all, especially polylactic acid as an aliphatic polyester is a plant-derived biodegradable clear plastic with a glass transition point as high as about 60° C., and attracts the highest attention as a promising material.

However, polylactic acid that is a polyester-based resin has a problem that the strength of the resin is lowered by hydrolysis. Various techniques are proposed to solve the problem.

For example, JP 7-316273 A describes a technique in which for capping the acid ends that affect hydrolysis, an aliphatic alcohol is made to coexist when a lactide or lactic acid is polymerized for producing polylactic acid as an acid end-capped polylactic acid.

JP 2007-291336 A proposes a technique of letting a polyester resin contain a reactive end capping agent and a phosphorus-based stabilizer to provide a polyester resin composition capable of holding the physical properties of the resin for a long period of time.

Further, JP 2008-7750 A describes a technique in which a buffering agent is added during the period after completion of esterification reaction or ester interchange reaction before the initial stage of polycondensation reaction, for decreasing the number of the acid ends of polyethylene terephthalate.

However, the aforementioned prior art has the following problem. In JP 7-316273 A, the acid ends of polylactic acid which affect hydrolysis are capped, but the effect of enhancing the hydrolysis resistance is not sufficient. In JP 2007-291336 A, a polyester resin is made to contain a reactive end capping agent and a phosphorus-based stabilizer, but satisfactory hydrolysis resistance is not obtained.

Further, JP 2008-7750 A describes a technique in which a buffering agent is added during the period after completion of esterification reaction or ester interchange reaction before the initial stage of polycondensation reaction for decreasing the number of acid ends of polyethylene terephthalate, but does not disclose a technique of enhancing the hydrolysis resistance of a polylactic acid-based composition.

In view of the background as described above, it could be helpful to provide a polylactic acid-based composition with excellent hydrolysis resistance.

SUMMARY

We thus provide:

(1) A polylactic acid-based composition, comprising a polylactic acid-based resin and a buffering agent and/or a compound derived from the buffering agent.

(2) A polylactic acid-based composition, according to (1) mentioned above, wherein the buffering agent is an alkali metal salt of an organic compound and/or an alkali metal salt of an inorganic compound.

(3) A polylactic acid-based composition, according to (2) mentioned above, wherein the alkali metal salt of an inorganic compound as the buffering agent is an alkali metal phosphate.

(4) A polylactic acid-based composition, according to any one of (1) through (3) mentioned above, wherein a carboxyl group reactive end capping agent is added.

(5) A polylactic acid-based composition, according to (4) mentioned above, wherein the carboxyl group reactive end capping agent is an epoxy compound and/or a carbodiimide compound.

(6) A polylactic acid-based composition, according to any one of (3) through (5) mentioned above, wherein the alkali metal phosphate is anhydrous.

(7) A polylactic acid-based composition, according to any one of (1) through (6) mentioned above, wherein the total content of the buffering agent and the compound derived from the buffering agent is 0.05 to 500 moles per ton of the polylactic acid-based composition.

(8) A polylactic acid-based composition, according to any one of (4) through (7) mentioned above, wherein the added amount of the carboxyl group reactive end capping agent is 0.01 to 10 parts by weight per 100 parts by weight of the polylactic acid-based resin.

(9) A polylactic acid-based composition, according to any one of (1) through (8) mentioned above, wherein the polylactic acid-based composition contains a plasticizer, and said plasticizer has a polyether-based segment and/or a polyester-based segment and a polylactic acid-based segment with a number average molecular weight of 1,500 or more.

(10) A polylactic acid-based composition, according to any one of (1) through (9) mentioned above, which contains a thermoplastic resin other than the polylactic acid-based resin.

(11) A film formed of the polylactic acid-based composition as set forth in any one of (1) through (10) mentioned above.

We thus provide a polylactic acid-based composition with good hydrolysis resistance. The polylactic acid-based composition can be preferably used for resins and molded articles such as fibers and films.

DETAILED DESCRIPTION

We intensively studied the aforementioned problem, i.e., a polylactic acid-based composition with excellent hydrolysis resistance, and as a result, found that a polylactic acid-based composition containing a polylactic acid-based resin and a buffering agent and/or a compound derived from the buffering agent could solve the problem all at once.

The polylactic acid-based resin used herein is a polymer having L-lactic acid units and/or D-lactic acid units as a main component. The main component in this case means that the rate of the lactic acid units per 100 ml % of all the monomer units in the polymer is largest, and it is preferred that the rate of the lactic acid units is 70 mol % to 100 mol % per 100 mol % of all the monomer units.

The poly-L-lactic acid refers to a polylactic acid polymer in which the content of L-lactic acid units is more than 50 mol % to 100 mol % per 100 mol % of all the lactic acid units in the polylactic acid polymer. On the other hand, the poly-D-lactic acid refers to a polylactic acid polymer in which the content of D-lactic acid units is more than 50 mol % to 100 mol % per 100 mol % of all the lactic acid units in the polylactic acid polymer.

The crystallinity of poly-L-lactic acid resin per se changes depending on the content of D-lactic acid units. That is, if the D-lactic acid unit content of the poly-L-lactic acid is larger, the crystallinity of the poly-L-lactic acid becomes low, making the resin more amorphous, and on the contrary, if the D-lactic acid unit content of the poly-L-lactic acid is smaller, the crystallinity of the poly-L-lactic acid becomes high. Similarly, the crystallinity of the poly-D-lactic acid resin per se changes depending on the content of L-lactic acid units. That is, if the L-lactic acid unit content of the poly-D-lactic acid increases, the crystallinity of the poly-D-lactic acid becomes low, making the resin more amorphous, and on the contrary, if the L-lactic acid unit content of the poly-D-lactic acid is smaller, the crystallinity of the poly-D-lactic acid becomes high. It is preferred that the L-lactic acid unit content of the poly-L-lactic acid or the D-lactic acid unit content of the poly-D-lactic acid is 80 to 100 mol % per 100 mol % of all the lactic acid units in view of maintaining the mechanical strength of the composition. A more preferred range is 85 to 100 mol %.

The polylactic acid-based resin may also contain other monomer units than lactic acid. Other monomers include glycol compounds such as ethylene glycol, propylene glycol, butanediol, heptanediol, hexanediol, octanediol, nonanediol, decanediol, 1,4-cyclohexanedimethanol, neopentyl glycol, glycerol, pentaerythritol, bisphenol A, polyethylene glycol, polypropylene glycol and polytetramethylene glycol, dicarboxylic acids such as oxalic acid, adipic acid, sebacic acid, azelaic acid, dodecanedionic acid, malonic acid, glutaric acid, cyclohexanedicarboxylic acid, terephthalic acid, isophthalic acid, phthalic acid, naphthalenedicarboxylic acid, bis (p-carboxyphenyl)methane, anthracenedicarboxylic acid, 4,4'-diphenyletherdicarboxylic acid, 5-sodiumsulfoisophthalic acid and 5-tetrabutylphosphoniumisophthalic acid, hydroxycarboxylic acids such as glycolic acid, hydroxypropionic acid, hydroxybutyric acid, hydroxyvaleric acid, hydroxycaproic acid and hydroxybenzoic acid, and lactones such as caprolactone, valerolactone, propiolactone, undecalactone and 1,5-oxepane-2-one. It is preferred that the copolymerized amount of the units of the other monomer selected from the compounds enumerated above is 0 to 30 mol % per 100 mol % of all the monomer units in the polylactic acid-based resin polymer. A more preferred range is 0 to 10 mol %.

It is preferred for fulfilling practical mechanical properties that the weight average molecular weight of the polylactic acid-based resin is 50,000 to 500,000, and a more preferred range is 100,000 to 250,000. Meanwhile, the weight average molecular weight refers to a molecular weight obtained by measuring using gel permeation chromatography (GPC) with chloroform as a solvent and calculating in terms of polymethylmethacrylate.

In the case where it is desired to enhance the heat resistance of the polylactic acid-based composition containing the polylactic acid-based resin, a mixture consisting of poly-L-lactic acid and poly-D-lactic acid can be used as the polylactic acid-based resin. If a mixture consisting of poly-L-lactic acid and poly-D-lactic acid is crystallized, stereocomplex crystals (SC crystals) different from the crystals formed of ordinary L-lactic acid or D-lactic acid only ($\alpha$ crystals) in crystal system are formed. The melting point of the SC crystals is higher than that of $\alpha$ crystals by as much as about 50° C., the polylactic acid-based composition can be crystallized to have higher heat resistance.

In view of efficiently forming SC crystals, it is preferred that the mixing ratio (by weight) of poly-L-lactic acid and poly-D-lactic acid is poly-L-lactic acid/poly-D-lactic acid=95/5 to 5/95. A more preferred range is poly-L-lactic acid/poly-D-lactic acid=90/10 to 10/90, and a more preferred range is 80/20 to 20/80. Further, in view of efficiently forming SC crystals and in view of maintaining the mechanical strength of the composition, it is preferred that the content of the L(D)-lactic acid units in the poly-L(D)-lactic acid used in this case is 90 to 100 mol % per 100 mol % of all the lactic acid units. A more preferred range is 95 to 100 mol %, and a further more preferred range is 98 to 100 mol %.

In view of maintaining the mechanical strength of the polylactic acid-based composition, it is preferred that the content of the polylactic acid-based resin is 20 to less than 100 wt % per 100 wt % of the entire polylactic acid-based composition. A more preferred range is 30 to 99.5 wt %, and a further more preferred range is 50 to 99 wt %.

In view of letting the composition have flexibility, impact resistance, moldability, etc., the polylactic acid-based resin can contain 0.1 to 200 parts by weight of a plasticizer per 100 parts by weight of the polylactic acid-based resin. A more preferred range of the plasticizer content is 1 to 100 parts by weight per 100 parts by weight of the polylactic acid-based resin, and a further more preferred range is 5 to 50 parts by weight. An especially preferred range is 8 to 20 parts by weight.

Examples of the plasticizer include phthalic acid ester-based plasticizers such as diethyl phthalate, dioctyl phthalate and dicyclohexyl phthalate, aliphatic dibasic acid ester-based plasticizers such as di-1-butyl adipate, di-n-octyl adipate, di-n-butyl sebacate and di-2-ethylhexyl azelate, phosphoric acid ester-based plasticizers such as diphenyl-2-ethylhexyl phosphate and diphenyloctyl phosphate, hydroxy polyvalent carboxylic acid ester-based plasticizers such as tributyl acetylcitrate, tri-2-ethylhexyl acetylcitrate and tributyl citrate, fatty acid ester-based plasticizers such as methyl acetylricinoleate and amyl stearate, polyhydric alcohol ester-based plasticizers such as glycerol triacetate and triethylene glycol dicaprylate, epoxy-based plasticizers such as epoxylated soybean oil, epoxylated linseed oil fatty acid butyl ester and octyl epoxystearate, polyester-based plasticizers such as polypropylene glycol sebacic acid ester, polyalkylene ether-based plasticizers, ether ester-based plasticizers, acrylate-based plasticizers, etc.

Further, in view of inhibiting bleed-out of the plasticizer, it is preferred that the molecule of the plasticizer has one or more polylactic acid segments with a number average molecular weight of 1,500 or more. For example, there is a block copolymer type plasticizer having a polyether-based segment and/or a polyester-based segment and a polylactic acid segment with a number average molecular weight of 1,500 or more. It is preferred that the number average molecular weight of the polylactic acid segment in the block copolymer type plasticizer is 2,000 or more. More preferred is 2,500 or more. The reason is that in the case where the molecule of the plasticizer has one or more polylactic acid segments with a molecular weight of 1,500 or more, the portion forms a eutectoid with the polylactic acid-based resin existing as a base material and that the plasticizer is connected with the polylactic acid-based resin existing as a base material due to an anchoring effect. In view of achieving both a plasticizing effect and heat resistance, it is preferred that the number average molecular weight of the polyether-based segment in the block copolymer type plasticizer is 5,000 to 100,000. A more preferred range is 6,500 to 50,000, and a further more preferred range is 8,000 to 20,000. It is preferred that the number average molecular weight of the polyester-based segment is 500 to 50,000, and a more preferred range is 700 to 30,000. A further more preferred range is 1,000 to 20,000. Further, it is preferred that the number average molecular weight of the block copolymer type plasticizer as a whole is 2,000 to 50,000. A more preferred range is 3,000 to 40,000, and a further more preferred range is 5,000 to 30,000. Preferred examples of the polyether-based segment include polyethylene glycol, polypropylene glycol, polytetramethylene glycol, polyethylene glycol-polypropylene glycol copolymer, etc. Preferred examples of the polyester-based segment include polybutylene terephthalate, polypropylene terephthalate, polybutylene sebacate, polybutylene succinate, polybutylene succinate/terephthalate, polybutylene adipate/terephthalate, polybutylene adipate/succinate, polypropylene sebacate, polypropylene succinate, polypropylene succinate/terephthalate, polypropylene adipate/terephthalate, polypropylene adipate/succinate, etc. It is preferred that the number of the aforementioned polylactic acid segments (L) and the number of the polyether-based segments and/or polyester-based segments (E) contained in the plasticizer are respectively one or more. Further, the order and configuration of the respective segment blocks is not especially limited, but in view of more effectively inhibiting the bleed-out, it is preferred that at least one polylactic acid segment block is located at an end of the molecule. Particular configurations of the block copolymer type plasticizer include E-L type in case of two blocks, L-E-L type in case of three blocks, E-L-E-L type in case of four blocks, etc.

Furthermore, the polylactic acid-based resin can contain a thermoplastic resin other than the polylactic acid-based resin for the purpose of improving various physical properties. A preferred content of the thermoplastic resin other than the polylactic acid-based resin is 0.1 to 400 parts by weight per 100 parts by weight of the polylactic acid-based resin. A more preferred content of the thermoplastic resin other than the polylactic acid-based resin is 0.3 to 200 parts by weight, and a further more preferred range is 0.5 to 100 parts by weight.

Examples of the thermoplastic resin include polyacetal, polyethylene, polypropylene, polyamide, poly(meth)acrylate, polyphenylene sulfide, polyetheretherketone, polyester, polysulfone, polyphenylene oxide, polyimide, polyetherimide, ethylene/glycidyl methacrylate copolymer, polyester elastomer, polyamide elastomer, ethylene/propylene terpolymer, ethylene/butene-1 copolymer, etc.

If a thermoplastic resin other than the polylactic acid-based resin is contained, physical properties can be enhanced for example as follows. If a poly(meth)acrylate is contained, the high temperature stiffness of the polylactic acid-based composition can be enhanced, and if a polyester is contained, the impact resistance and toughness of the polylactic acid-based composition can be enhanced. In order to make the above-mentioned effects more excellent, polymethyl methacrylate selected from poly(meth)acrylates can be preferably used as the thermoplastic resin other than the polylactic acid-based resin, and polybutylene succinate, polybutylene succinate/adipate or polybutylene adipate/terephthalate, etc. selected from polyesters can be preferably used.

It is important that the polylactic acid-based composition contains a polylactic acid-based resin and a buffering agent and/or a compound derived from the buffering agent. It is preferred that the total content of the buffering agent and the compound derived from the buffering agent is 0.05 to 500 moles per ton of the polylactic acid-based composition. A more preferred total content of the buffering agent and the compound derived from the buffering agent is 0.08 to 300 moles per ton of the polylactic acid-based composition, and a further more preferred range is 0.1 to 100 mol/t. A still further more preferred range is 0.3 to 50 mat, and the most preferred range is 0.5 to 13 mol/t. It is preferred that the total content of the buffering agent and the compound derived from the buffering agent is 0.05 mol/t or more, since the effect of enhancing the hydrolysis resistance is sufficient, and it is preferred that the total content of the buffering agent and the compound derived from the buffering agent is 500 mol/t or less, since it can be prevented that an excessive amount of the buffering agent accelerates the hydrolysis reaction on the contrary.

If a buffering agent is added to the polylactic acid-based composition, the hydrogen ions generated from the carboxyl groups existing at the ends of polymer chains, which cause the hydrolysis of the polylactic acid-based resin, can be arrested by the buffering agent. As a result, the hydrolysis resistance can be enhanced. That is, the addition of the buffering agent is intended to use the action (buffering action) of keeping the pH little varied even if an acid (hydrogen ions) exists in the system to some extent.

The buffering agent is not especially limited if it is a substance capable of being dissociated to show ionicity and arresting the hydrogen ions derived from the end carboxyl groups of the polymer chains of the polylactic acid-based resin. However, in view of more effectively showing the buffering action and exhibiting the hydrolysis resistance, it is preferred that the buffering agent is a metal salt of an organic compound and/or a metal salt of an inorganic compound. Further, it is preferred that the buffering agent is an alkali metal salt. That is, it is especially preferred that the buffering agent is an alkali metal salt of an organic compound and/or an alkali metal salt of an inorganic compound.

Further, in view of more effectively showing the buffering action and exhibiting the hydrolysis resistance, it is preferred that the buffering agent, i.e., a metal salt of an organic compound and/or a metal salt of an inorganic compound is a salt of a weak acid to medium acid.

For example, in the case where a metal salt of an organic compound is used as the buffering agent, an alkali metal salt of an organic compound such as phthalic acid, citric acid, carbonic acid, lactic acid, tartaric acid or polyacrylic acid can be used. Further, other examples of the metal salt of an organic compound as the buffering agent include sodium bis-(4-butylphenyl)phosphate (trade name: Adekastab NA10 produced by Adeka Corporation), sodium 2,2'-methylene-bis (4,6-di-tert-butylphenyl)phosphate (trade name: Adekastab NA11 produced by Adeka Corporation), bis(2,4,8,10-tetra-tert-butyl-6-oxo-12H-dibenzo[d,g][1,3,2]dioxaphosphocin-6-oxide) aluminum hydroxide salt (trade name: Adekastab NA21 produced by Adeka Corporation) as a sodium salt of an organic compound, etc.

Above all, it is preferred that the alkali metal is potassium or sodium, since a precipitate as a catalyst residue is unlikely to be produced. Preferred examples include potassium hydrogen phthalate, sodium dihydrogen citrate, disodium hydrogen citrate, potassium dihydrogen citrate, dipotassium hydrogen citrate, sodium carbonate, sodium tartrate, potassium tartrate, sodium lactate, potassium lactate, sodium hydrogen carbonate, sodium polyacrylate, etc.

It is preferred that a metal salt of an organic compound is used as the buffering agent, for the reason that since the metal salt of an organic compound is likely to be dissolved in the polylactic acid-based resin when they are mixed, it can be prevented that the buffering agent appears as a defect of a foreign matter when, for example, the polylactic acid-based composition is processed into a film or fibers.

Further, in the case where a metal salt of an inorganic compound is used as the buffering agent, an alkali metal salt of an inorganic compound such as phosphoric acid, phosphorous acid or hypophosphorous acid can be used.

Above all, it is preferred that the alkali metal is potassium or sodium, since a precipitate as a catalyst residue is unlikely to be produced. Preferred examples include disodium hydrogen phosphate, dipotassium hydrogen phosphate, potassium dihydrogen phosphate, sodium dihydrogen phosphate, sodium hydrogen phosphite, potassium hydrogen phosphite, sodium hypophosphite, potassium hypophosphite, etc.

As the buffering agent, the abovementioned metal salts of organic compounds and metal salts of inorganic compounds can be used, and among these buffering agents, as the buffering agent, an alkali metal phosphate as one of the metal salts of inorganic compounds is preferred in view of heat resistance and hydrolysis resistance. Further, it is especially preferred in view of heat resistance and hydrolysis resistance that the alkali metal is sodium and/or potassium.

In the case where the buffering agent is an alkali metal phosphate, the amount of phosphorus in the polylactic acid-based composition can be determined, for example, using a fluorescent X-ray spectrometer (Model 3270) produced by Rigaku Denki K.K. By this method, the amount of the buffering agent and the compound derived from the buffering agent in the polylactic acid-based composition can be obtained. Furthermore, the amount of the alkali metal in the composition can be determined, for example, using an atomic absorption spectrometer (atomic absorption spectrometer with a background correction system using Zeeman split spectrum 180-80, flame: acetylene-air).

Moreover, it is preferred in view of hydrolysis resistance that the alkali metal phosphate is anhydrous. An alkali metal phosphate usually exists as either a hydrous compound containing crystal water or an anhydrous compound not containing crystal water. If an anhydrous alkali metal phosphate is used, the hydrolysis resistance effect by the buffering agent is high, since the hydrolysis as caused by the water of a hydrous compound does not occur. Meanwhile, also in the case where the alkali metal phosphate contains a hydrate, it is preferred that the amount of the hydrate is smaller.

The method for producing the polylactic acid-based composition containing a polylactic acid-based resin and a buffering agent and/or a compound derived from the buffering agent described later can be a method of adding the buffering agent when and/or after the polylactic acid-based resin is produced by polymerization.

An ordinary polyester obtained from a dicarboxylic acid and a diol is produced by undergoing a polymerization process consisting of esterification reaction or ester interchange reaction and subsequent polycondensation reaction, but unlike this ordinary polyester, polylactic acid is produced by a special polymerization process called "direct polycondensation" using lactic acid as a raw material or "ring-opening polymerization" using a lactide as a raw material. Therefore, we thus intensively studied the timing when the buffering agent should be added and, as a result, found that if the buffering agent is added when and/or after the polylactic acid-based resin is produced by polymerization, the effect of the buffering agent can be sufficiently exhibited.

The method for adding the buffering agent when the polylactic acid-based resin is produced by polymerization can be a method of adding the buffering agent together with lactic acid monomer or lactide monomer, polymerization initiator, catalyst, etc., before start of polymerization when lactic acid as a raw material is polymerized with direct dehydration condensation or when a lactide is polymerized with ring-opening. Further, the method for adding after the polylactic acid-based resin has been produced by polymerization can be a method of adding the buffering agent when the polylactic acid-based resin produced by polymerization is re-molten and molded. For more effectively exhibiting the effect of the buffering agent, it is preferred to add the buffering agent after the lactic acid-based resin has been produced by polymerization.

The compound derived from a buffering agent refers to the compound existing as a result of the dissociation of the buffering agent to show ionicity in the composition in which the mode of the compound is different from that assumed by the buffering agent immediately after the addition thereof. That is, the compound derived from a buffering agent means the compound exhibiting negative ionicity produced by the dissociation of the buffering agent, which arrests the hydrogen ions of the end carboxyl groups of the polymer chains. For example, when the buffering agent is disodium hydrogen phosphate or dipotassium hydrogen phosphate, the compound derived from the buffering agent can be phosphoric acid or sodium hydrogen phosphite. When the buffering agent is potassium hydrogen phosphite, the compound derived from the buffering agent can be phosphorous acid.

To the polylactic acid-based composition, it is preferred to add a carboxyl group reactive end capping agent to significantly enhance hydrolysis resistance by synergism when the carboxyl group reactive end capping agent is used together with the buffering agent. That is, the buffering agent alone has a certain effect of hydrolysis resistance, but to exhibit a larger effect it is effective to use a carboxyl group reactive end capping agent together. For example, even if the buffering agent alone is increased, an excessive amount of the buffering agent can promote the hydrolysis reaction on the contrary as described before. On the other hand, even if the carboxyl group reactive end capping agent alone is used, a large hydrolysis resistance effect cannot be obtained.

The carboxyl group reactive end capping agent is not especially limited if it is a compound capable of capping the end carboxyl groups of the polymer, and can be selected from those used as polymer end carboxyl group capping agents. The carboxyl group reactive end capping agent can cap the end carboxyl groups of the polylactic acid-based resin and also can cap the carboxyl groups of acidic low-molecular compounds such as lactic acid and formic acid produced, for example, by thermal decomposition and hydrolysis of the polylactic acid-based resin and a naturally derived organic filler. Further, it is more preferred that the abovementioned end capping agent is a compound capable of capping also the hydroxyl group ends produced by the acidic low-molecular compounds due to thermal decomposition.

As the carboxyl group reactive end capping agent, it is preferred to use at least one compound selected from epoxy compounds, oxazoline compounds, oxazine compounds, carbodiimide compounds and aziridine compounds. Above all, an epoxy compound and/or a carbodiimide compound are preferred.

The epoxy compounds that can be preferably used as the carboxyl group reactive end capping agent include glycidyl ether compounds, glycidyl ester compounds, glycidyl amine compounds, glycidyl imide compounds, glycidyl methacrylate, alicyclic epoxy compounds. Other epoxy compounds that can be used include epoxy-modified fatty acid glycerides of epoxylated soybean oil, epoxylated linseed oil, epoxylated whale oil, etc., phenol novolac epoxy resins, cresol novolac epoxy resins, etc.

Examples of the epoxy compounds include bisphenol A diglycidyl ether epoxy resin, benzoic acid glycidyl ester, versatic acid glycidyl ester, N-glycidyl phthalimide, isocyanuric acid triglycidyl, etc. Among them, in view of reactivity and hydrolysis resistance, isocyanuric acid triglycidyl can be especially preferably used.

The carbodiimide compound that can be used as the carboxyl group reactive end capping agent is not especially limited, if it is a compound having a carbodiimide group represented by at least one (—N=C=N—) in the molecule, and monocarbodiimide, dicarbodiimide and polycarbodiimide can be used.

Examples of the carbodiimide compound include N,N'-di-2,6-diisopropylphenylcarbodiimide, 2,6,2',6'-tetraisopropyldiphenylcarbodiimide, di-2,6-dimethylphenylcarbodiimide, poly(4,4'-diphenylmethanecarbodiimide), poly(phenylenecarbodiimide) and poly(triisopropylphenylenecarbodiimide), etc. They can be suitably used in view of hydrolysis resistance.

As the abovementioned carboxyl group reactive end capping agent, one or more compounds can be arbitrarily selected to be used.

It is preferred that the added amount of the carboxyl group reactive end capping agent is 0.01 to 10 parts by weight per 100 parts by weight of the polylactic acid-based resin. A more preferred range is 0.05 to 5 parts by weight, and a further more preferred range is 0.1 to 2 parts by weight. It is preferred that the added amount of the carboxyl group reactive end capping agent is 0.01 to 10 parts by weight per 100 parts by weight of the polylactic acid-based resin, since the hydrolysis resistance can be significantly enhanced due to the synergism acting when the carboxyl group reactive end capping agent is used together with the buffering agent.

A preferred combination large in the synergism between the buffering agent and the carboxyl group reactive end capping agent and excellent in hydrolysis resistance consists of an alkali metal phosphate as the buffering agent and an epoxy compound and/or a carbodiimide compound as the carboxyl group reactive end capping agent. It is most preferred that the epoxy compound is isocyanuric acid triglycidyl and that the carbodiimide compound is N,N'-di-2,6-disopropylphenyl-carbodiimide, 2,6,2',6'-tetraisopropyldiphenylcarbodiimide or di-2,6-dimethylphenylcarbodiimide.

The polylactic acid-based composition can contain appropriate amounts of particles and additives as required, to such an extent that the effect of this invention is not impaired. Examples of the additives include a flame retarder, thermal stabilizer, light stabilizer, antioxidant, coloration preventive, ultraviolet light absorber, antistatic agent, crystal nucleating agent, tackifier, organic lubricant such as fatty acid ester or wax, defoaming agent such as polysiloxane, colorant such as pigment or dye, etc.

The polylactic acid-based composition can be processed into extrusion products such as non-oriented films, oriented films, inflation films and tubes, injection molded articles with various shapes, and other molded articles such as bottles, foams and yarns.

EXAMPLES

Our compositions and methods are explained below more particularly in reference to examples, but is not limited thereto or thereby.

[Hydrolysis Resistance Evaluation Methods]

Forced film deterioration method (1) Forced non-oriented film deterioration method A film was stored in a thermo-hygrostat kept at 45° C. and 90% RH for 30 days.

(2) Forced oriented film deterioration method

A film was stored in a thermo-hygrostat kept at 50° C. and 90% RH for 30 days.

(3) A forced inflation film deterioration method

A film was stored in a thermo-hygrostat kept at 40° C. and 90% RH for 30 days.

Measurement of breaking strength of a film in longitudinal direction

According to the method specified in ASTM D882 (revised in 1997), an Instron type tensile tester was used to measure under the following conditions:

Measuring instrument: Automatic film strength-elongation measuring instrument "Tensilon AMF/RTA-100" produced by Orientec Co., Ltd.

Sample size: 10 m wide×gauge length (longitudinal direction) 100 mm

Stress rate: 200 mm/min

Test environment: Temperature 23° C., humidity 65% RH

Evaluation of hydrolysis resistance

The breaking strength holding rate of a film was obtained from the following formula using the breaking strengths measured before and after forced deterioration and evaluated according to the following criterion:

Breaking strength holding rate (%)=a/b×100 where a is the breaking strength after forced deterioration, and b is the breaking strength before forced deterioration ⊚ (excellent): The breaking strength holding rate is 80% or more.

○ (good): The breaking strength holding rate is 70% to less than 80%.

Δ (acceptable): The breaking strength holding rate is 50% to less than 70%.

x (unacceptable): The breaking strength holding rate is less than 50%.

[Weight Average Molecular Weight]

Weight average molecular weight in terms of standard polymethylmethacrylate measured by gel permeation chromatograph (GPC) Waters 2690 produced by Nippon Waters K.K. Measured using chloroform as the solvent, at a flow velocity of 0.5 mL/min by injecting 0.1 mL of a solution with a sample concentration of 1 mg/1 mL at a column temperature of 40° C.

In the case where the test substance cannot be dissolved in chloroform, another solvent in which the test substance can be dissolved such as hexafluoroisopropanol can be used.

[Polylactic Acid-Based Resins]

P-1: Poly-L-lactic acid resin with a weight average molecular weight of 190,000 in terms of PMMA and with a D-lactic acid unit content of 1 mol %

P-2: Poly-L-lactic acid resin with a weight average molecular weight of 190,000 in terms of PMMA and with a D-lactic acid unit content of 5 mol %

P-3: Poly-L-lactic acid resin with a weight average molecular weight of 190,000 in terms of PMMA and with a D-lactic acid unit content of 12 mol %

[Buffering Agents]
K-1: Potassium dihydrogen phosphate
K-2: Sodium dihydrogen phosphate
K-3: Potassium dihydrogen citrate
K-4: Sodium dihydrogen phosphate dihydrate
K-5: Sodium 2,2'-methylene-bis(4,6-di-tert-butylphenyl) phosphate (trade name: Adekastab NA11 produced by Adeka Corporation)
K-6: Bis(2,4,8,10-tetra-tert-butyl-6-oxo-12H-dibenzo[d,g][1,3,2]dioxaphosphocin-6-oxide) aluminum hydroxide salt (trade name: Adekastab NA21 produced by Adeka Corporation)
[Carboxyl Group Reactive End Capping Agents]
M-1: N,N'-di-2,6-diisopropylphenylcarbodiimide {Stabaxol (registered trademark) I-LF produced by Rhein Chemie}
M-2: Bisphenol A glycidyl ether {Epikote (registered trademark) 828 produced by Japan Epoxy Resin}
M-3: Isocyanuric acid triglycidyl (produced by Tokyo Chemical Industry Co., Ltd.)
[Plasticizer]
L-1: Zero point zero five part by weight of tin octylate was mixed with 70 parts by weight of polyethylene glycol with a weight average molecular weight of 12,000 and 30 parts by weight of L-lactide, and polymerization was performed in a reaction vessel with a stirrer in nitrogen atmosphere at 150° C. for 2 hours, to obtain a block copolymer L-1 of polyethylene glycol and polylactic acid having a polylactic acid segment with a weight average molecular weight of 2,500.
[Thermoplastic Resins]
S-1: Polybutylene succinate/adipate {Bionolle (registered trademark) #3001 produced by Showa Highpolymer Co., Ltd.}
S-2: Polymethylmethacrylate {Sumipex (registered trademark) LG produced by Sumitomo Chemical Co., Ltd.}
[Production of Polylactic Acid-Based Compositions (Non-Oriented Films)]

Example 1

One hundred parts by weight of the polylactic acid-based resin (P-2), 1 part by weight of the thermoplastic resin (S-1), 1 part by weight of the carboxyl group reactive end capping agent (M-1) and 10 mol/t of the buffering agent (K-1) were supplied into a vented twin-screw extruder, and the reaction product was extruded from a T die set at a temperature of 200° C. and electrostatically brought into contact with a 30° C. casting drum, to be cooled and solidified to obtain a 0.2 mm cast (non-oriented) film.

The hydrolysis resistance of the obtained non-oriented film was good.

Examples 2 to 20 and Comparative Examples 1 to 3

Films were produced as described for Example 1, except that the thermoplastic resin, buffering agent and carboxyl group reactive end capping agent constituting each film were changed as shown in Tables 1-1 and 1-2.
[Production of Polylactic Acid-Based Compositions (Oriented Films)]

Example 21

One hundred parts of the polylactic acid-based resin (P-2), 10 parts by weight of the thermoplastic resin (S-2), 1 part by weight of the carboxyl group reactive end capping agent (M-1) and 10 mol/t of the buffering agent (K-1) were supplied into a vented twin-screw extruder, and the reaction product was extruded from a T die set at a temperature of 200° C. and electrostatically brought into contact with a 30° C. casting drum, to be cooled and solidified to obtain a 0.2 mm thick cast (non-oriented) film.

In succession, the cast film was stretched by a roll stretcher in the longitudinal direction to 3.0 times at a temperature of 85° C. The monoaxially stretched sheet was once cooled on a cooling roll and subsequently held at both the edges by clips and guided into a tenter, to be stretched in the transverse direction to 3.0 times at a temperature of 80° C. In succession, with the length kept constant, the film was heat-treated at a temperature of 140° C. for 10 seconds and relaxed by 1% in the transverse direction to obtain a 0.05 mm thick biaxially oriented film.

The hydrolysis resistance of the obtained oriented film was good.

Examples 22 to 29 and Comparative Examples 4 and 5

Films were produced as described for Example 21, except that the thermoplastic resin, buffering agent and carboxyl group reactive end capping agent constituting each film were changed as shown in Table 2.
[Production of Polylactic Acid-Based Compositions (Inflation Films)]

Example 30

Fifteen parts by weight of the polylactic acid-based resin (P-1), 55 parts by weight of the polylactic acid-based resin (P-3), 20 parts by weight of the thermoplastic resin (S-2), 10 parts by weight of the plasticizer (L-1), 1 part by weight of the carboxyl group reactive end capping agent (M-1) and 10 mol/t of the buffering agent (K-1) were supplied into a vented twin-screw extruder, and the reaction product was extruded as a tube from a circular die set at a temperature of 180° C., and while air of about 25° C. was blown from a cooling ring, the air was injected into the tube to form bubbles. The obtained film was guided between pinch rolls, to form a tubular film provided like two flat films. The film constrained in both directions was heat-treated at a film temperature of 120° C. for 2 seconds and subsequently wound around a winding roll to obtain a 0.05 mm thick inflation film.

The hydrolysis resistance of the obtained inflation film was good.

Examples 31 to 43 and Comparative Examples 6 and 7

Films were produced as described for Example 30, except that the thermoplastic resin, plasticizer, buffering agent and carboxyl group reactive end capping agent constituting each film were changed as shown in Table 3.

The results of the abovementioned examples and comparative examples are shown in Tables 1-1, 1-2, 2, 3 and 4.

TABLE 1-1

|  |  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Thermo-plastic resin | Compound | S-1 | — | S-1 | S-1 | S-1 | S-1 | S-1 | S-1 | S-1 | S-1 | S-1 | S-1 |
|  | Content (parts by weight) | 1 | — | 1 | 1 | 1 | 1 | 1 | 1 | 1 | 1 | 1 | 1 |
| Buffering agent | Compound | K-1 | K-1 | K-1 | K-1 | K-1 | K-1 | K-1 | K-1 | K-1 | K-1 | K-1 | K-2 |
|  | Content (mol/t) | 10 | 10 | 50 | 100 | 270 | 480 | 0.6 | 0.3 | 0.1 | 0.07 | 0.03 | 10 |
| Carboxyl group reactive end capping agent | Compound | M-1 | M-1 | M-1 | M-1 | M-1 | M-1 | M-1 | M-1 | M-1 | M-1 | M-1 | M-1 |
|  | Content (parts by weight) | 1 | 1 | 1 | 1 | 1 | 1 | 1 | 1 | 1 | 1 | 1 | 1 |
| Hydrolysis resistance {breaking strength holding rate (%)} |  | ◎ (88) | ◎ (88) | ○ (79) | ○ (72) | Δ (67) | Δ (60) | ◎ (80) | ○ (76) | ○ (71) | Δ (64) | Δ (56) | ◎ (81) |

TABLE 1-2

|  |  | Example 13 | Example 14 | Example 15 | Example 16 | Example 17 | Example 18 | Example 19 | Example 20 | Comparative Example 1 | Comparative Example 2 | Comparative Example 3 |
|---|---|---|---|---|---|---|---|---|---|---|---|---|
| Thermo-plastic resin | Compound | S-1 | S-1 | S-1 | S-1 | S-2 | S-1 | S-1 | S-1 | S-1 | — | — |
|  | Content (parts by weight) | 1 | 1 | 1 | 1 | 20 | 1 | 1 | 1 | 1 | — | — |
| Buffering agent | Compound | K-3 | K-4 | K-1 | K-1 | K-1 | K-1 | K-1 | K-1 | — | — | — |
|  | Content (mol/t) | 10 | 10 | 10 | 10 | 10 | 10 | 10 | 10 | — | — | — |
| Carboxyl group reactive end capping agent | Compound | M-1 | M-1 | M-2 | M-3 | M-1 | M-1 | M-1 | — | — | — | M-1 |
|  | Content (parts by weight) | 1 | 1 | 1 | 1 | 1 | 3 | 0.05 | — | — | — | 1 |
| Hydrolysis resistance {breaking strength holding rate (%)} |  | ○ (73) | ○ (70) | ◎ (80) | ◎ (90) | ◎ (91) | ○ (79) | ○ (72) | Δ (59) | X (36) | X (29) | X (48) |

TABLE 2

|  |  | Example 21 | Example 22 | Example 23 | Example 24 | Example 25 | Example 26 | Example 27 | Example 28 | Example 29 | Comparative Example 4 | Comparative Example 5 |
|---|---|---|---|---|---|---|---|---|---|---|---|---|
| Thermo-plastic resin | Compound | S-2 | — | — | — | — | — | — | — | — | — | — |
|  | Content (parts by weight) | 10 | — | — | — | — | — | — | — | — | — | — |
| Buffering agent | Compound | K-1 | K-1 | K-1 | K-1 | K-2 | K-3 | K-4 | K-1 | K-1 | — | — |
|  | Content (mol/t) | 10 | 10 | 300 | 0.1 | 10 | 10 | 10 | 5 | 10 | — | — |
| Carboxyl group reactive end capping agent | Compound | M-1 | M-1 | M-1 | M-1 | M-1 | M-1 | M-1 | — | — | — | M-1 |
|  | Content (parts by weight) | 1 | 1 | 1 | 1 | 1 | 1 | 1 | — | — | — | 1 |
| Hydrolysis resistance {breaking strength holding rate (%)} |  | ◎ (94) | ◎ (91) | Δ (64) | ○ (72) | ◎ (87) | ◎ (81) | ○ (79) | Δ (61) | Δ (65) | X (38) | X (47) |

TABLE 3

|  |  | Example 30 | Example 31 | Example 32 | Example 33 | Example 34 | Example 35 | Example 36 | Example 37 | Example 38 | Example 39 | Comparative Example 6 | Comparative Example 7 |
|---|---|---|---|---|---|---|---|---|---|---|---|---|---|
| Thermo-plastic resin | Compound | S-2 | — | — | — | — | — | — | — | — | — | — | — |
|  | Content (parts by weight) | 20 | — | — | — | — | — | — | — | — | — | — | — |
| Plasticizer | Plasticizer | L-1 | L-1 | — | L-1 | L-1 | L-1 | L-1 | L-1 | L-1 | L-1 | L-1 | L-1 |
|  | Content (parts by weight) | 10 | 30 | — | 30 | 30 | 30 | 30 | 30 | 30 | 30 | 30 | 30 |

TABLE 3-continued

|  |  | Example 30 | Example 31 | Example 32 | Example 33 | Example 34 | Example 35 | Example 36 | Example 37 | Example 38 | Example 39 | Comparative Example 6 | Comparative Example 7 |
|---|---|---|---|---|---|---|---|---|---|---|---|---|---|
| Buffering agent | Compound | K-1 | K-1 | K-1 | K-1 | K-1 | K-1 | K-2 | K-3 | K-4 | K-1 | — | — |
|  | Content (mol/t) | 10 | 10 | 10 | 10 | 1 | 10 | 10 | 10 | 10 | 10 | — | — |
| Carboxyl group reactive end capping agent | Compound | M-1 | M-1 | M-1 | M-1 | M-1 | M-1 | M-1 | M-1 | M-1 | — | — | M-1 |
|  | Content (parts by weight) | 1 | 1 | 1 | 0.1 | 0.1 | 3 | 1 | 1 | 1 | — | — | 1 |
|  | Parts by weight per 100 parts by weight of the polylactic acid-based resin | 1.4 | 1.4 | 1.4 | 0.14 | 0.14 | 4.3 | 1.4 | 1.4 | 1.4 | — | — | 1.4 |
| Hydrolysis resistance {breaking strength holding rate (%)} |  | ⊚ (81) | ○ (77) | ⊚ (84) | Δ (69) | Δ (64) | ○ (73) | ○ (74) | Δ (68) | Δ (64) | Δ (55) | X (33) | X (46) |

TABLE 4

|  |  | Example 40 | Example 41 | Example 42 | Example 43 |
|---|---|---|---|---|---|
| Thermoplastic resin | Compound | S-2 | S-2 | — | — |
|  | Content (parts by weight) | 20 | 20 | — | — |
| Plasticizer | Plasticizer | L-1 | L-1 | L-1 | L-1 |
|  | Content (parts by weight) | 10 | 10 | 30 | 30 |
| Buffering agent | Compound | K-5 | K-6 | K-5 | K-6 |
|  | Content (mol/t) | 10 | 10 | 10 | 10 |
| Carboxyl group reactive end capping agent | Compound | M-1 | M-1 | M-1 | M-1 |
|  | Content (parts by weight) | 1 | 1 | 1 | 1 |
|  | Parts by weight per 100 parts by weight of the polylactic acid-based resin | 1.4 | 1.4 | 1.4 | 1.4 |
| Hydrolysis resistance {breaking strength holding rate (%)} |  | ⊚ (80) | ⊚ (82) | ○ (77) | ○ (79) |

INDUSTRIAL APPLICABILITY

The polylactic acid-based composition of this invention can be preferably used for various molded polylactic acid-based articles requiring hydrolysis resistance.

The invention claimed is:

1. A method of producing a polylactic acid-based composition comprising 1) a polylactic acid-based resin, 2) a carboxyl group reactive end capping agent, and 3) a buffering agent which is an alkali metal salt of an inorganic compound of phosphoric acid selected from the group consisting of potassium dihydrogen phosphate and/or sodium dihydrogen phosphate and/or a compound derived from the buffering agent, the method comprising:
   producing the polylactic acid-based resin by polymerization; and
   adding the buffering agent after production of the polylactic acid-based resin.

2. The method according to claim 1, comprising 0.01 to 10 parts by weight per 100 parts by weight of the polylactic acid-based resin of the carboxyl group reactive end capping agent.

3. The method according to claim 1, further comprising a plasticizer having a polyether-base segment and/or a polyester-based segment and a polylactic acid-based segment with a number average molecular weight of 1,500 or more.

4. The method according to claim 1, further comprising a thermoplastic resin other than the polylactic acid-based resin.

5. The method according to claim 1, wherein the alkali metal salt of phosphoric acid is anhydrous.

6. The method according to claim 5, comprising 0.01 to 10 parts by weight per 100 parts by weight of the poly lactic acid-based resin of the carboxyl group reactive end capping agent.

7. The method according to claim 1, wherein total content of the buffering agent and the compound derived from the buffering agent is 0.05 to 500 moles per ton of the polylactic acid-based composition.

8. The method according to claim 7, comprising 0.01 to 10 parts by weight per 100 parts by weight of the polylactic acid-based resin of the carboxyl group reactive end capping agent.

9. The method according to claim 1, wherein the carboxyl group reactive end capping agent is an epoxy compound and/or a carbodiimide compound.

10. The method according to claim 9, comprising 0.01 to 10 parts by weight per 100 parts by weight of the polylactic acid-based resin of the carboxyl group reactive end capping agent.

11. The method according to claim 9, further comprising a plasticizer having a polyether-based segment and/or a polyester-based segment and a polylactic acid-based segment with a number average molecular weight of 1,500 or more.

12. A film formed of the polylactic acid-based composition produced by the method of claim 1.

* * * * *